United States Patent [19]
Jo

[11] Patent Number: 5,796,077
[45] Date of Patent: Aug. 18, 1998

[54] OPTIMUM FUZZY METHOD FOR CONTROLLING A RICE COOKER

[75] Inventor: Sung-O Jo, Suwon, Rep. of Korea

[73] Assignee: Samsung Electronics Co., Ltd., Kyungki-Do, Rep. of Korea

[21] Appl. No.: 784,553

[22] Filed: Jan. 21, 1997

[30] Foreign Application Priority Data

Jan. 19, 1997 [KR] Rep. of Korea ............... 96-1083

[51] Int. Cl.$^6$ .................................................. H05B 1/02
[52] U.S. Cl. ............... 219/497; 219/501; 219/506; 374/102; 395/900; 364/477.01
[58] Field of Search .................. 219/707, 494, 219/497, 499, 501, 506, 413; 374/102, 103; 395/900; 364/477

[56] References Cited

U.S. PATENT DOCUMENTS

| | | |
|---|---|---|
| 5,300,757 | 4/1994 | Hara et al. |
| 5,311,268 | 5/1994 | Ohzeki et al. ............... 355/285 |
| 5,386,099 | 1/1995 | Has ............... 219/413 |
| 5,552,584 | 9/1996 | Idebro ............... 219/707 |

FOREIGN PATENT DOCUMENTS 4-61817  4/1992  Japan.

*Primary Examiner*—Mark H. Paschall
*Attorney, Agent, or Firm*—Larson & Taylor

[57] ABSTRACT

An optimum fuzzy method applies a genetic algorithm to a fuzzy function which determines on the amount of rice and resolves switching patterns of a heater in a cooking cycle. The optimum fuzzy method controls a rice cooker by controlling the on/off times of its heater by the use of a fuzzy function in a cooking operation. The method includes: a step wherein experimental data is abstracted, and then is converted into desirable data to fit heating conditions; a fuzzy logic step in which the desirable data is divided into fuzzy areas, a fuzzy function is constructed according to the divided fuzzy areas, and an error value of the fuzzy function is produced after verifying the constructed fuzzy function; a comparison fuzzy function step in which the fuzzy function is applied to a microcomputer if the error value is within the range of the reference values; and a step wherein a genetic algorithm step is applied if said error value is not within the range of the reference values, and then said fuzzy logic step is returned to.

8 Claims, 5 Drawing Sheets

OPTIMUM FUZZY METHOD FOR CONTROLLING A RICE COOKER

BACKGROUND OF THE INVENTION

(1) Field of the Invention

The present invention relates to an optimum fuzzy method for controlling a rice cooker, and more particularly to an optimum method applying a Genetic Algorithm to a fuzzy function which determines the amount of rice in the rice cooker and resolves switching patterns of a heater in a cooking stroke.

(2) Description of Background Information

The conventional arts using a fuzzy method for controlling of a rice cooker are as follows.

The U.S. Pat. No. 5,300,757 filed on Jul. 1, 1991, discloses a cooking apparatus which includes means for obtaining a value or a combination of values indicative of a given amount of food that is to be cooked, and a fuzzy inference section for applying heating conditions.

And Japanese Patent The Laid-open Publication Hei 4-61817 filed on Jul. 2, 1990, discloses a heating means for a rice cooker using a fuzzy measuring apparatus, and for cooking food by optimum electrical conductivity.

With reference to the attached drawings, a conventional rice cooker apparatus and an fuzzy method for controlling of the rice cooker are described as follows.

FIG. 4 schematically shows a cross-sectional view of a structure of a typical rice cooker, and FIG. 5 is a flow chart of a conventional fuzzy method for controlling of a rice cooker.

As shown in FIG. 4, a conventional rice cooker comprises: a cooker body 3 which is loaded into the inner side a cabinet case 1; a main heater 6 coupled with the bottom of the inside of the cabinet case 1; a band heater 5 coupled with the inner side wall of the cabinet case 1; a cover 2 coupled with the top part of said cabinet case 1; a lid heater 4 coupled with said cover 2; a temperature sensor 7 coupled with the base of the inside of the cabinet case 1 which senses the temperature of said cooker body 3.

Also, as shown in FIG. 5, a conventional fuzzy method for controlling a rice cooker comprises: a step S1 in which experimental data is abstracted, and then converted into desirable data to fit heating conditions; a step S3 of a fuzzy logic in which said data is divided into fuzzy areas; a step S4 in which a fuzzy function is constructed according to said divided fuzzy areas; a step S5 in which said constructed fuzzy function is verified in virtue of an error value of the fuzzy function; a step S6 of a comparison of the fuzzy function to return said dividing step S3 if said error value of the fuzzy function is not within the range of the reference values; a step S7 to apply said fuzzy function to a microcomputer(Hereinafter referred to as a MICOM) if said error value of the fuzzy function is within the range of the reference values.

Operations of the conventional rice cooker and the fuzzy method according to the aforementioned structure will now be described.

First, referring to FIG. 4, operations in the conventional rice cooker are as follows.

During a cook stroke, a main heater 6 is turned on and off proper switching patterns, and during a heat insulating stroke, a band heater 5 and a lid heater 4 is turned on and off. Here, said temperature sensor 7 makes use of a thermister.

Recently, for an optimum cooking operation, it is a trend that a fuzzy function is used to decide the amount of food and the on/off control of said main heater 6.

Next, as shown in FIG. 5, operations in an fuzzy method for controlling a rice cooker are as follows.

First, during the 'Abstracting Data and Converting Data' step S1 experimental data is abstracted, and then is converted into desirable data to fit heating conditions. Second, during the 'Dividing Fuzzy Areas' step S3, said data is divided into fuzzy areas. More specifically, the amount of rice, the amount of water, and the applied voltage are converted respectively to measure the temperature of the cooker body within setting timings for composition of an acceptable fuzzy function, and then said acquired temperature-data are applied for dividing said fuzzy areas according to the experence of experts.

Next, during the 'Constructing a Fuzzy Function' Step S4, a fuzzy function is constructed according to said divided fuzzy areas, and during 'Verifying a Fuzzy Function' step S5, an error value of the fuzzy function is produced after verifying said constructed fuzzy function. In step S6, the error value is measured. If it is not less than the reference values, the routine returns to step S3.

If said error value is below reference values, the routine procedes to the 'Applying to MICOM' step S7 wherein the fuzzy function is applied to a MICOM for cook.

Consequently, said fuzzy function is constructed by said divided fuzzy areas, and then if one of the desirable conditions is not favorable to cooking the previous cycle, it iterates to redivide fuzzy areas acquired in the previous cycle, and observe the results.

But, the conventional fuzzy method for controlling a rice cooker must acquire an optimum fuzzy function which satisfies each of conditions, the amount of rice, the amount of water, and the applied voltage. If a cooking operation is not satisfactory at even one of the conditions, the operation may procede through many iterations to operate a rotation of observing the result for redividing fuzzy areas which are acquired before. Consequently, it has a problem that an optimum cook control is exceptionally difficult.

SUMMARY OF THE INVENTION

Accordingly, the present invention is directed to an optimum fuzzy method for controlling a rice cooker that substantially obviates one or more of the aforementioned problems due to limitations and disadvantages of the related art.

The objective of the present invention is to provide a method which applies a genetic algorithm to the fuzzy function determining the amount of the cooking food and the switching pattern in the cooking cycle, and which reduces the number of iterations used to produce the optimum fuzzy function.

In order to achieve this objective, an optimum fuzzy method for controlling the rice cooker comprises:

a step wherein experimental data is extracted, and then is converted into desirable data to fit heating conditions;

a step of fuzzy logic wherein said data is divided into fuzzy areas, a fuzzy function is constructed according to said divided fuzzy areas, and an error value of said fuzzy function is produced after verifying said constructed fuzzy function;

a step in which the fuzzy function is applied to a MICOM if said error value of fuzzy function is within the range of the reference values;

a step wherein a genetic algorithm is applied if said error value is not within the range of the reference values, and then said fuzzy logic step is returned to.

BRIEF DESCRIPTION OF THE DRAWINGS

The preferred embodiment of the present invention will now be described more specifically with reference to the attached drawings, wherein.

DETAILED DESCRIPTION OF THE PREFERRED EMBODIMENT

The preferred embodiment of the present invention will become apparent from a study of the following detailed description is conjunction with the accompanying drawings.

Figure 1:
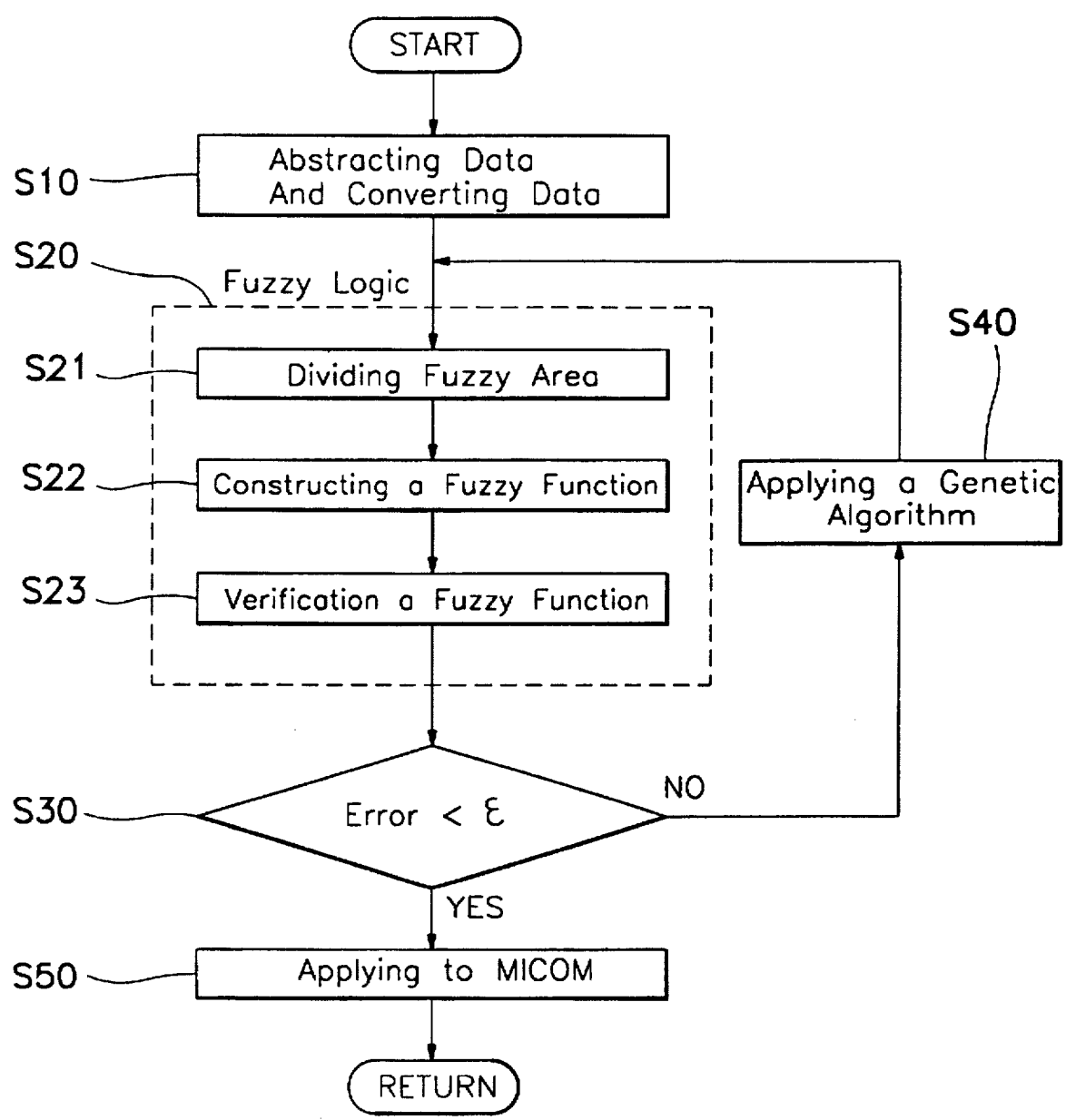
FIG. 1 is a flow chart illustrating an optimum fuzzy method for controlling a rice cooker in accordance with the embodiment of the present invention.

As shown in FIG. 1, an optimum fuzzy method for controlling a rice cooker according to the present invention comprises:

an 'Abstracting Data and Converting Data' step S10 in which experimental data is abstracted, and then converted into desirable data to fit heating conditions;

a 'Dividing Fuzzy Areas' step S21 in which said data is divided into fuzzy areas;

a 'Constructing a Fuzzy Function' step S22 in which said fuzzy function is constructed according to said divided fuzzy areas;

a 'Verifying a Fuzzy Function' step S23 wherein an error value of said fuzzy function is produced after verifying said constructed fuzzy function;

a step S30 in which said fuzzy function is compared to decide on whether said error value of fuzzy function is within the range of the setting value;

an 'Applying a Genetic Algorithm' step S40 in which a genetic algorithm is applied if said error value of fuzzy function is not within the range of the reference values, and then said step S21 is returned to; and an 'Applying to MICOM' step S50 in which said fuzzy function is applied to a MICOM for cooking if said error value is within range of the reference values.

Figure 2:
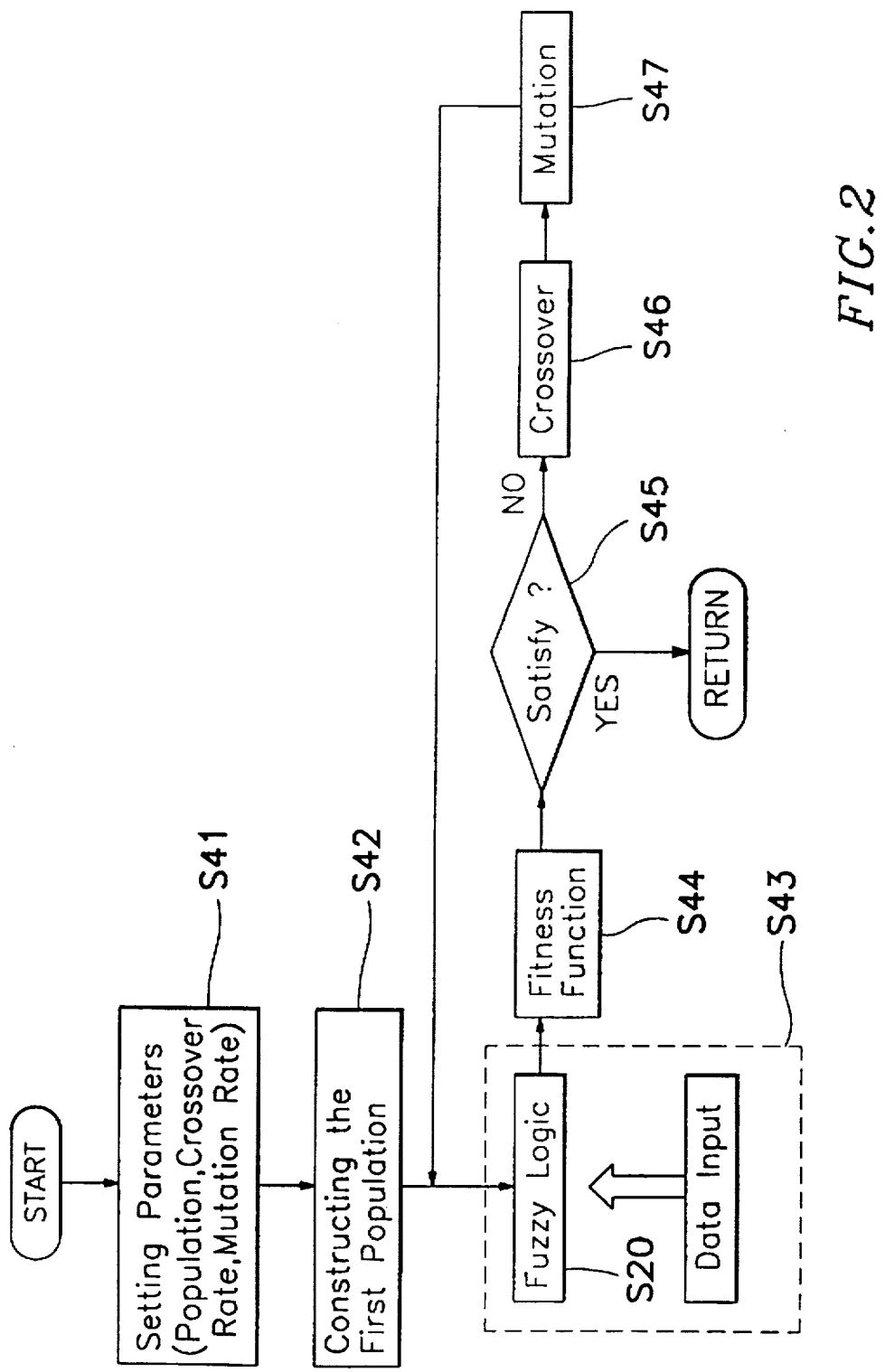
FIG. 2 is a flow chart illustrating a genetic algorithm in accordance with the embidiment of the present invention.

As shown in FIG. 2, 'Applying a Genetic Algorithm' step S40 comprises:

a 'Setting Parameters' step S41 wherein the the parameters of population, crossover rate, and mutation rate are set up;

a 'Constructing the first Population' step S42 wherein the first population is constructed according to random sampling numbers;

an applying fuzzy logic step S43 in which a fuzzy function is constructed using said first population, and data acquired from said abstracting data and converting data step S10 are substituted into said fuzzy function;

a 'Fitness Function' step S44 in which a fitness function is acquired for the present constructed fuzzy function according to the substituted result;

a step S45 in which the value of said fitness function is determined to be either greater or less than a desired setting value;

a 'Crossover' step S46 wherein a fitness rate of each fuzzy function is produced in total fitness if said fitness function is lower than said setting value, and said fuzzy function is crossed over mutually to have a high duplicate probability according to said fitness rate; and a 'Mutation' step S47 wherein a new population is produced the same size as the first population and caused to mutate, and said fuzzy logic step S43 is returned to.

The inventive fuzzy method will now be described more specifically.

Figure 3:
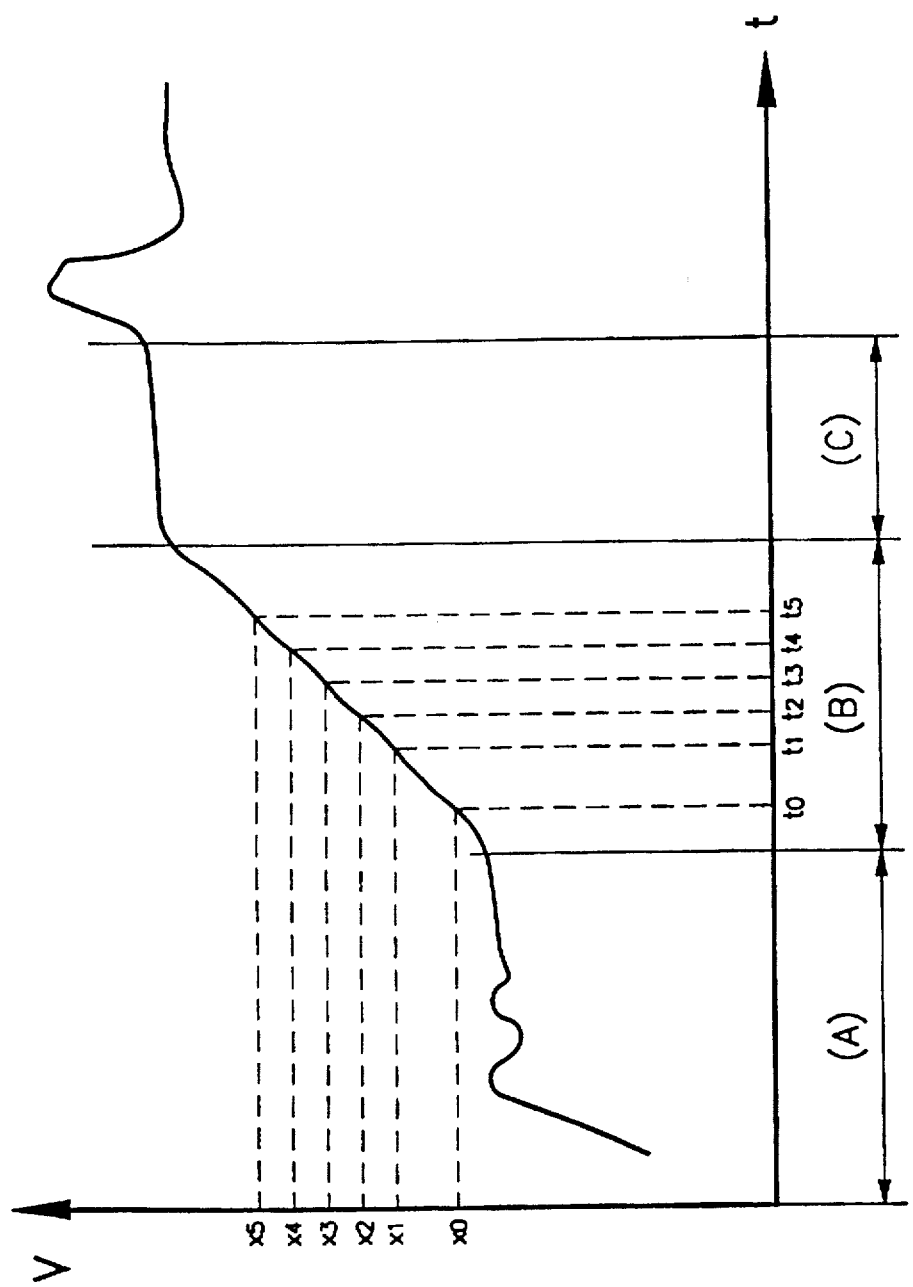
FIG. 3 is a graph depicting the temperarure inside the inventive rice cooker in relation to elapsed time.
Figure 4:
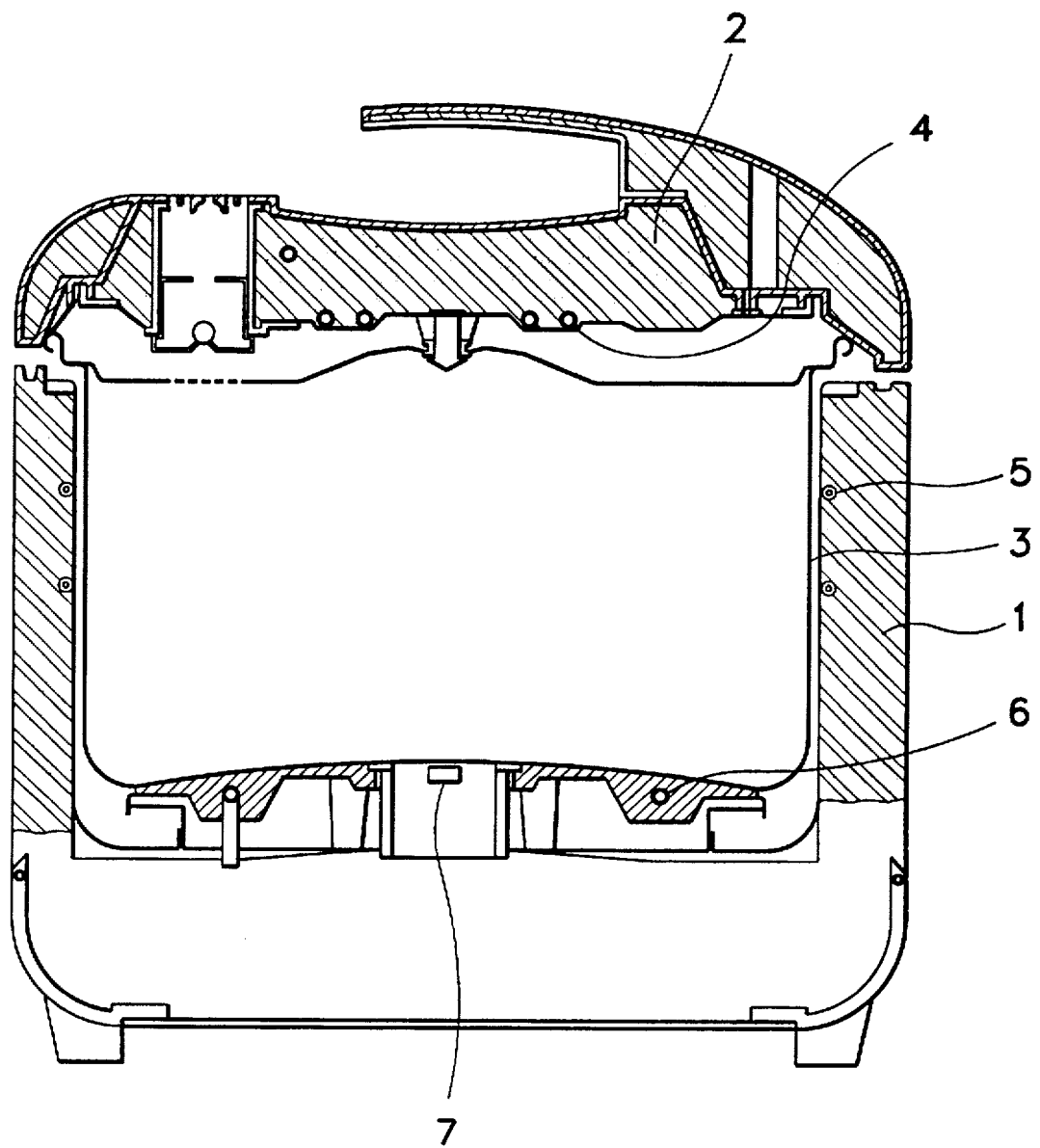
FIG. 4 schematically depicts a cross-sectional view of a conventional rice cooker.
Figure 5:
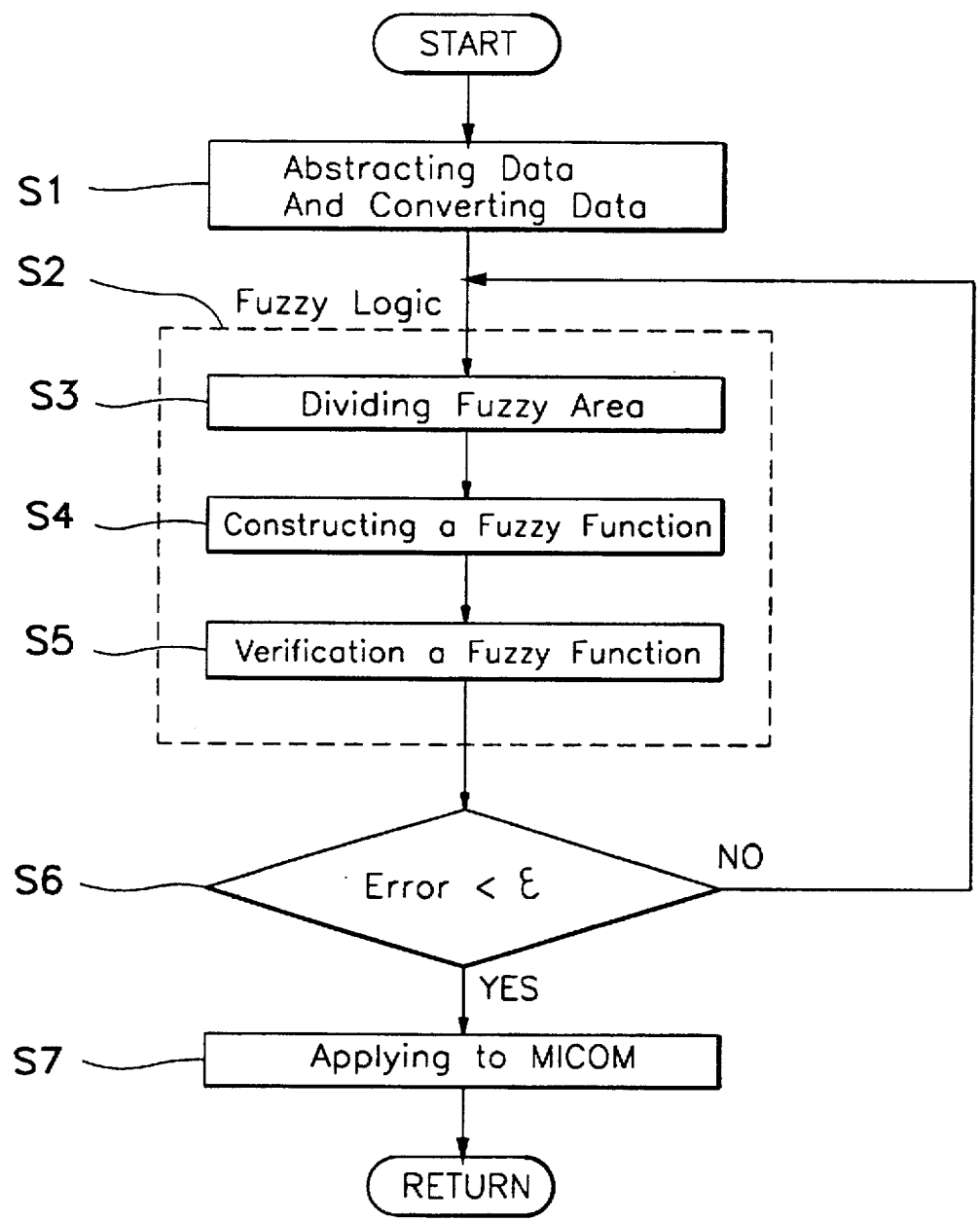
FIG. 5 is a flow chart illustrating a conventional fuzzy method for controlling a rice cooker.

FIG. 3 is a graph depicting the temperature inside the inventive rice cooker in relation to elapsed time. The temperature of the water in the cooker, while being heated by the main heater 6, remains stable during time segment A. Next, during time segment B, the water is heated to 100 C.; the rice in temperature over time has a slope of approximately one. During time segment C, the water temperature remains at 100 C. until it has been evaporated or absorbed by the rice. The end of this time segment is marked by the rapid rise in the temperature of the inside of the cooker, which is caused by the elimination of liquid water in the appratus. The time segment C is an important period in which the cooking status must be monitored. The fuzzy control determines the value of the fuzzy function based on temperature data acquired during time segment A, and then controls the on/off pattern of said main heater 6 during time segment C so as to maintain a consistent temperature therein.

FIG. 1 is a flow chart illustrating an optimum fuzzy method for controlling a rice cooker.

First, an 'Abstracting Data and Converting Data' step S10, experimental data is abstracted, and then is converted into desirable data to fit heating conditions. According to the present invention, this data comprises the setting conditions: the amount of rice, the amount of water, the applied voltage. The temperature inside the cooker during time segment A is a result of the processing of this data.

More particulary, said amount of rice setting condition is an inclusive 2–10 persons. The applied voltage setting condition is one of five types when the cooker is powered by the commom 220 V AC: 186, 203, 220, 238, or 254. The amount of water setting condition is "Large", "Medium", or "Small". Consequently, there are 135 possible combinations (9*5*3=135).

Next, as shown in FIG. 3, the voltages X1, X2, X3, X4, X5 are acquired from the data and applied to fuzzy inputs of a conventional microcomputer. Then the switching time Y of said main heater 6 is acquired and applied to the fuzzy output. Here, said fuzzy output is a temperature of heater, and said voltages X1, X2, X3, X4, X5 are produced in setting time intervals t1, t2, t3, t4, t5 which are in reference a setting voltage X0 established during time segment A.

Next, the fuzzy logic step S20 is entered. It includes a 'Dividing Fuzzy Areas' S21 in which said data is divided into fuzzy areas, a 'Constructing a Fuzzy Function' step S22 in which a fuzzy function is constructed according to said divided fuzzy areas, and a 'Verifying a Fuzzy Function' step S23 in which an error value of said fuzzy function is produced after verifying said constructed fuzzy function.

More specifically, during voltage-time pairs X1:Y, X2:Y, X3:Y, X4:Y X5:Y are applied to said genetic algorithm. Since the on/off time Y of said main heater 6 influences food status to a major degree, it is based on data considered from expert's experience.

Next, during the comparison of said fuzzy function step S30 it is determined whether said error value is less than the reference values. If it is not, an 'Applying a Genetic Algorithm' step S40, wherein a genetic algorithm is applied, and then the fuzzy logic step S20 are sequentially executed Conversely, if the error value is less than the the reference values, the 'Applying to MICOM' step S50 proceded to, wherein the fuzzy function is applied to a MICOM.

Said genetic algorithm was developed by Prof. John Holland early 1970's. It includes a kind of conceptions: a evolution, a natural selection, a mutation, and reproduction.

Said evolution according to the law of the survial of the fittest, is occured by a chromosome. As said natural selection generates a dominant chromosome frequently, but weed out a recessive chromosome selectively. And said mutation generates parents and other chromosomes, and said reproduction turns over new chromosomes to descendant, which has a heredity of parents through a crossover with parents.

Meanwhile, said genetic algorithm is used to represent an optimum algorithm which is on the basis of said conceptions. Accordingly, it applies to the fuzzy function, and then produces an optimum fuzzy function.

As shown in FIG. 2, said genetic algorithm operates as follows.

First, during a 'Setting Parameters' step S41, the parameters 'Population, Crossover rate, Mutation rate' are set up, and then in the 'Constructing the first Population' step S42, the first population is constructed according to random sampling numbers.

Then in the applying fuzzy logic step S43, said fuzzy function is constructed using the first population. Data which is acquired from said 'Abstracting Data and Converting Data' step S10 as shown in FIG. 1, are substitued to the fuzzy function.

Next, a 'Fitness Function' step S45 acquires a fitness function from the fuzzy function according to said substituted result. Said fitness function is as follows.

$$\text{Fitness Function} = 1/\Sigma(\text{error})^2 \qquad (1)$$

During a step S45 it is determined whether said fitness function value is over, i.e., greater than, a desirable setting value ε. If it is not, the 'Crossover' step S46 is proceded to, wherein a rate of fitness of each fuzzy function is produced in total fitness, and crossovers mutually said fuzzy function to have a high duplicate probability according to said rate of fitness. Here, said crossover is to apply 'Roulette-Wheel Method' to have a high duplicate probability according to said rate of fitness.

Next, a 'Mutation' step S47 produces the same numbers of new population as the first population for generating said mutate, and returns said fuzzy logic step S43. More specifically, it determines whether said fitness function sacrifies for said new population, and it is iterated said steps S41–S47 to generate finally one string of fuzzy output. Accordingly, after acquiring said optimum fuzzy function as shown in FIG. 1, an 'Applying a MICOM' step S50 applies said fuzzy function to a microcomputer.

In summary, in this an optimum fuzzy method for controlling a rice cooker, the temperature of a cooker as fuzzy input is acquired at any times during the cooking cycle, the on/off patterns of said heater are controlled via fuzzy output which must fit said heating conditions, and said fuzzy function is constructed after said input and output apply to said genetic algorithm.

As described above, the present invention can provide an optimum fuzzy method for controlling a rice cooker which applies a genetic algorithm to the fuzzy function for deciding the amount of cooking food and switching patterns during a cooking cycle, and which greatly reduces the numbers of iterations executed for determining of an optimum fuzzy function.

It will be apparent to those skilled in the art that various modifications and variations can be made in an optimum fuzzy method for controlling a rice cooker of the present invention without departing from the spirit or scope of the invention. Thus it is intended that the present invention cover the modifications and variations of this invention provided they come within the scope of the appended claims and their equivalents.

What is claimed is:

1. An optimum fuzzy method for controlling a rice cooker by controlling the on/off times of a heater of the rice cooker by the use of a fuzzy function in the cooking cycle, said method comprising:

obtaining experimental data and converting the experimental data into desirable data to fit heating conditions of the rice cooker;

a performing fuzzy logic step comprising dividing said desirable data into fuzzy areas, constructing a fuzzy function according to said divided fuzzy areas, and producing an error value of said fuzzy function after verifying the constructed fuzzy function;

comparing said error values with a range of reference values and applying said fuzzy function to a microcomputer if said error value is within the range of reference values; and applying a genetic algorithm to the fuzzy function if said error value is not within the range of reference values, and, after the genetic algorithm is applied, returning to said fuzzy logic step.

2. An optimum fuzzy method for controlling a rice cooker as defined in claim 1 wherein said heating conditions comprise the amount of rice, the amount of water, and the voltage applied to the heater.

3. An optimum fuzzy method for controlling a rice cooker as defined in claim 1 wherein said genetic algorithm comprises:

setting up parameters of population, crossover rate, and mutation rate;

constructing a first population based on random sampling numbers;

performing a fuzzy logic step comprising constructing a fuzzy function using the first population and using said desired data;

applying a fitness function to determine the fitness of the fuzzy function constructed using said desired data;

determining whether said fitness function is satisfied by the constructed fuzzy function;

performing a crossover step wherein a degree of fitness for each fuzzy function relative to total fitness is produced if said fitness function is not satisfied by the constructed fuzzy function, and wherein parameters of said fuzzy function are crossed mutually with a further fuzzy function with a high duplicate probability according to said degree of fitness;

performing a mutation step wherein a new population is produced of the same size as the first population but containing at least one mutation therefrom; and returning to said fuzzy logic step after said mutation step.

4. An optimum fuzzy method for controlling a rice cooker as defined claim 3, wherein said fitness function is $1/\Sigma(\text{error})^2$.

5. A fuzzy method for controlling a rice cooker by controlling the on/off times of a heater of the rice cooker by use of a fuzzy function in the cooking cycle, said method comprising:

a) obtaining experimental data with respect to established rice cooker parameters, b) converting said experimental data into beginning data to fit heating conditions;

c) applying fuzzy logic to said beginning data by:
   i) dividing said data into fuzzy areas;
   ii) constructing a fuzzy function according to said fuzzy areas; and
   iii) verifying said fuzzy function and creating an error value associated with said fuzzy function;
d) comparing said error value to a reference value;
e) if said error value is less than or equal to said reference value, applying said fuzzy function to a microcomputer for controlling said rice cooker; and
f) if said error value is greater than said reference value, developing a new fuzzy function by applying a genetic algorithm, said applying of said genetic algorithm comprising:
   i) constructing an initial fuzzy function;
   ii) applying said beginning data to said initial fuzzy function;
   iii) applying a fitness function to said initial fuzzy function after said beginning data is applied thereto;
   iv) if said fitness function is satisfied, applying steps c) through e) to said initial fuzzy function; and
   v) if said fitness function is not satisfied, developing a new fuzzy function having parameters based on parameters of said initial fuzzy function; vi) applying the beginning data to the new fuzzy function; vii) applying the fitness function to the new fuzzy function, and if the fitness function is not satisfied; viii) developing a further new fuzzy function based on parameters of said initial fuzzy and of any new fuzzy function previously developed; and ix) repeating steps vi), vii) and viii) until said fitness function is satisfied by the further new fuzzy function; and x) applying steps c) through e) to said new fuzzy function.

6. A fuzzy method as in claim 5, wherein the step of developing a further new fuzzy function comprises applying the steps of crossover and mutation to parameters of said initial fuzzy function and of any other new fuzzy function previously developed in said step f) to develop the parameters of the further new fuzzy function.

7. A fuzzy method as in claim 6, wherein said step of crossover comprises producing a further new fuzzy function by exchanging parameters of two previously developed fuzzy functions.

8. A fuzzy method as in claim 6, wherein said step of mutation comprises producing a new set of fuzzy functions using previously developed fuzzy functions most nearly satisfying said fitness function.

* * * * *